(12) United States Patent
Hörnig

(10) Patent No.: US 7,816,652 B2
(45) Date of Patent: Oct. 19, 2010

(54) X-RAY DETECTOR

(75) Inventor: Mathias Hörnig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 339 days.

(21) Appl. No.: 11/743,926

(22) Filed: May 3, 2007

(65) Prior Publication Data

US 2007/0257196 A1 Nov. 8, 2007

(30) Foreign Application Priority Data

May 5, 2006 (DE) ............ 10 2006 021 046

(51) Int. Cl.
*G01T 1/20* (2006.01)
(52) U.S. Cl. .................. 250/370.11; 250/370.09
(58) Field of Classification Search ............ 250/370.11, 250/370.09, 370.01
See application file for complete search history.

(56) References Cited

U.S. PATENT DOCUMENTS

| | | | |
|---|---|---|---|
| 4,870,279 A * | 9/1989 | Cueman et al. ............ 250/368 |
| 4,947,412 A * | 8/1990 | Mattson ................... 378/19 |
| 5,617,461 A | 4/1997 | Schreiner ................. 378/98.5 |
| 6,034,406 A | 3/2000 | Kobayashi et al. ......... 257/435 |
| 6,057,552 A * | 5/2000 | Stettner et al. ........ 250/370.09 |
| 6,437,340 B1 * | 8/2002 | Finkler et al. .......... 250/370.11 |
| 6,667,480 B2 * | 12/2003 | Kajiwara et al. ....... 250/370.01 |
| 2005/0219388 A1 | 10/2005 | Hornig ................... 348/241 |

FOREIGN PATENT DOCUMENTS

| | | |
|---|---|---|
| DE | 19527148 | 7/1995 |
| DE | 102004016585 A1 | 3/2007 |
| EP | 0766317 A2 | 4/1997 |
| EP | 0838859 A2 | 4/1998 |
| EP | 1113290 A2 | 7/2001 |
| GB | 2370960 A | 7/2002 |

* cited by examiner

*Primary Examiner*—David P Porta
*Assistant Examiner*—Jessica L Eley
(74) *Attorney, Agent, or Firm*—King & Spalding L.L.P.

(57) ABSTRACT

To reduce quality losses in edge areas of an X-ray image, caused by temperature fluctuations, an X-ray detector (1) is arranged with a scintillator (2) for converting X radiation into light and with an active matrix (3) of pixel readout elements, arranged behind it in the direction of X radiation, in such a manner that the active matrix (3) is shielded in an optically opaque manner with respect to the scintillator (2) in at least one edge area (6) of the cross-over area of the scintillator (2) and the active matrix (3); in particular, the optically opaque shielding is suitable for forming a dark reference zone (5) when the scintillator (2) is present.

15 Claims, 2 Drawing Sheets

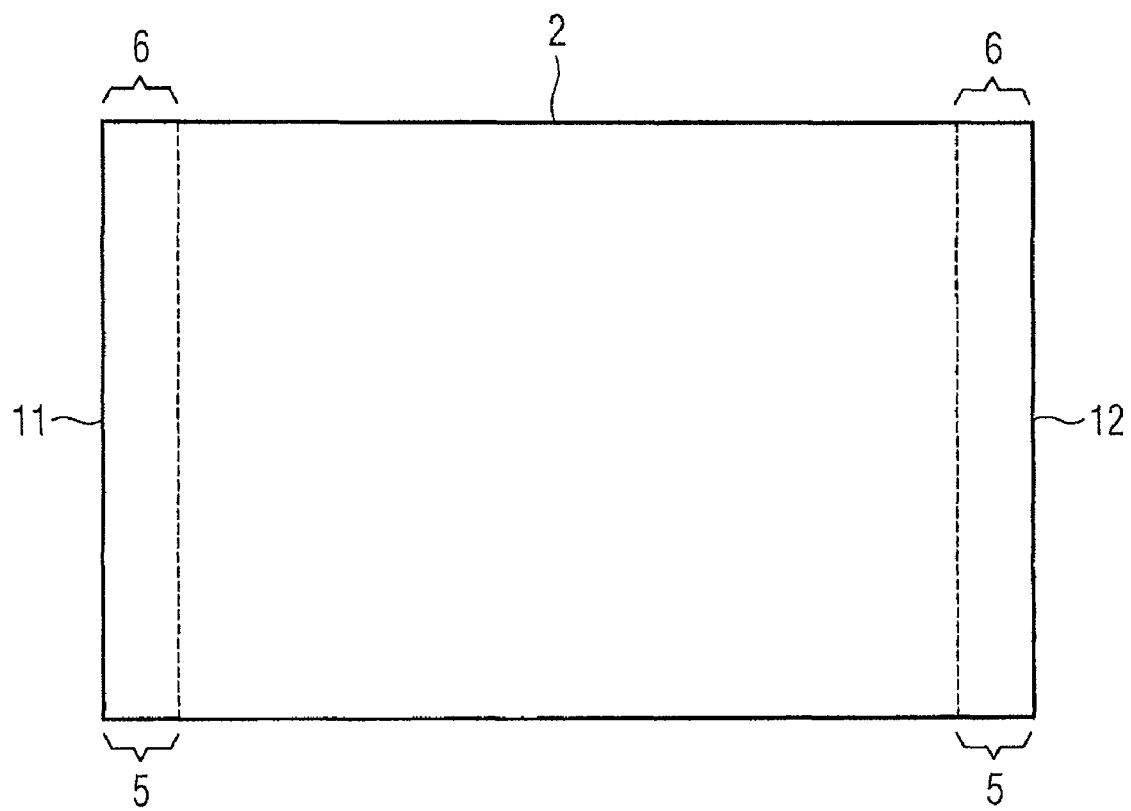

X-RAY DETECTOR

RELATED APPLICATION

This application claims priority from German Patent Application No. 10 2006 021 046.8, which was filed on May 5, 2006, and is incorporated herein by reference in its entirety.

TECHNICAL FIELD

The invention relates to a digital X-ray detector comprising a scintillator and an active matrix.

BACKGROUND

X-ray detectors based on active readout matrices, e.g. of amorphous silicon (a-Si), in front of which a scintillator layer is located, have been known for some years. The impinging X radiation is converted into visible light in the scintillator layer, converted into electrical charge in light-sensitive pixel elements of the readout matrix and stored spatially resolved. Related technologies also use an active pixel matrix of amorphous silicon but combined with an X-ray converter (e.g. selenium) which converts the impinging X radiation directly into electrical charge. The stored charge is then read out electronically via an active switching element, converted into digital signals and forwarded to an electronic image processing system. Such X-ray detectors are frequently constructed as flat-panel detectors.

Many digital X-ray detectors exhibit a power dissipation which produces a steep increase in temperature or thermal fluctuations of the X-ray detector and its components. In general, temperature rises and fluctuations lead to offset patterns and sensitivity differences, especially in edge areas of the X-ray detector. This is mainly caused by temperature-related widening or shrinking of adhesive at contact points between the scintillator and the active matrix and leads to a reduced image quality of X-ray images at the edge areas. The width of this disturbance can comprise up to about 100 pixel readout elements from the scintillator edge inward in the direction of the scintillator center. This reduces the meaningfully useful width of an X-ray detector by about 3 cm.

Some X-ray detectors have active air or water cooling in order to prevent temperature rises or fluctuations. Such cooling is known, for example, from JP 11271456 A. It is also known to remove losses in the X-ray image quality, caused by thermal influences, from the image by subsequent electronic corrections.

In each row of the active matrix, sections are defined which are shielded from the X radiation. In general, this is implemented by the absence of a scintillator together with X-ray shielding (lead). The totality of these shielded sections is designated the so-called dark reference zone (DRZ). Measurement values detected in the dark reference zone, so-called dark values, are used for correcting the remaining sections of the respective rows, that is to say the useful area. This method is known as line noise correction (LNC).

SUMMARY

Quality losses, caused by temperature fluctuations, can be reduced in edge areas of X-ray images in a digital X-ray detector, particularly in an X-ray detector with a dark reference zone.

According to an embodiment, a digital X-ray detector may comprise a scintillator for converting X radiation into light, and an active matrix of pixel readout elements arranged behind the scintillator in the direction of X radiation, wherein the active matrix is shielded in an optically opaque manner with respect to the scintillator in at least one edge area of the cross-over area of said scintillator and the active matrix.

BRIEF DESCRIPTION OF THE DRAWINGS

The embodiments will be explained in greater detail in the text which follows by means of diagrammatically represented embodiments in the drawing without the invention being restricted to these embodiments.

FIG. 5 shows a top view of a scintillator of a further X-ray detector according to an embodiment.

DETAILED DESCRIPTION

Figure 1:
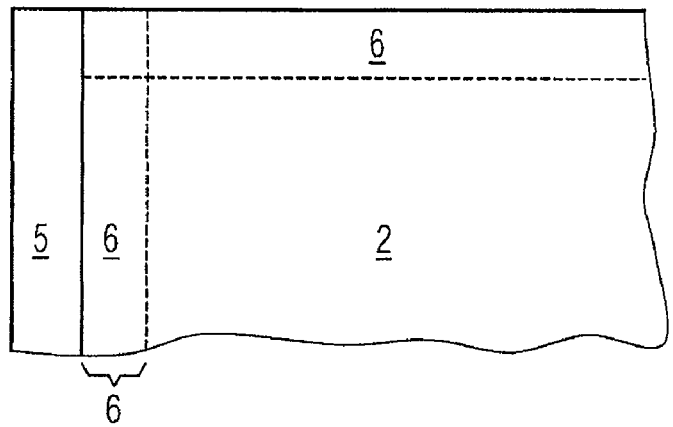
FIG. 1 shows a top view of a conventional scintillator of an X-ray detector.

In the X-ray detector according to an embodiment, temperature-related quality losses which are produced, for example, by widening or shrinking of adhesive at contact points in the edge area, are avoided by the fact that the active matrix is shielded in an optically opaque manner with respect to the scintillator in at least one edge area of a cross-over area of the scintillator and the active matrix, particularly in a dark reference zone.

If, according to one embodiment, the area of the scintillator, the area of the active matrix and the cross-over area of the scintillator and the active matrix are essentially equal so that the active matrix is completely covered by the scintillator, the optically opaque shielding forms an area which can be used as dark reference zone in a simple and loss-free manner. Or, in other words: in an X-ray detector with a dark reference zone, the critical edge area of the adhesion between active matrix and scintillator is shifted into the dark reference zone and is thus uncritical for the actual X-ray image. Thus, the entire area of the active matrix, apart from the DRZ, can be used unrestrictedly for imaging without losses in quality.

According to an embodiment, shielding of the scintillator with respect to the incident X radiation is provided in an edge area of the cross-over area of the scintillator and the active matrix.

According to a further embodiment, the active matrix is shielded with respect to the scintillator by a light-absorbing, particularly black, layer or coating. Such a layer or coating on the top of the active matrix or the underside of the scintillator can be integrated in a particularly simple manner and with little expenditure into the X-ray detector by being applied, for example, photolithographically.

The light-absorbing layer is advantageously formed by a light-absorbing adhesive. The use of such an adhesive can be integrated with little expenditure into a production process of the X-ray detector.

According to a further embodiment, the edge area of the cross-over area of the scintillator and the active matrix has a width of between 10- and 100-times the width of a pixel readout unit. This is advantageous since the width within which quality losses mainly occur is between 10 and 100 pixel widths. A pixel readout unit generally has a width of about 150 µm.

According to a further embodiment, the active matrix is shielded in an optically opaque manner with respect to the scintillator in two opposite edge areas, particularly in the low edge areas. A typical dark reference zone provided for line noise correction is formed by two such opposite row edge areas.

A further advantage is the standardization of the process for producing detectors with respect to a detector family consisting of X-ray detectors with DRZ also suitable for dynamic applications, so-called Universal detectors for radiography and fluoroscopy (URF), and those without DRZ, so-called radiography detectors (RAD). According to the embodiments, uniform scintillators and active matrices and even a uniform combination of the two can be used for both variants; the only difference is produced by housings which differ in their X-ray shielding. This means a lesser expenditure in the production of the X-ray detectors and thus also a cost saving.

Figure 2:
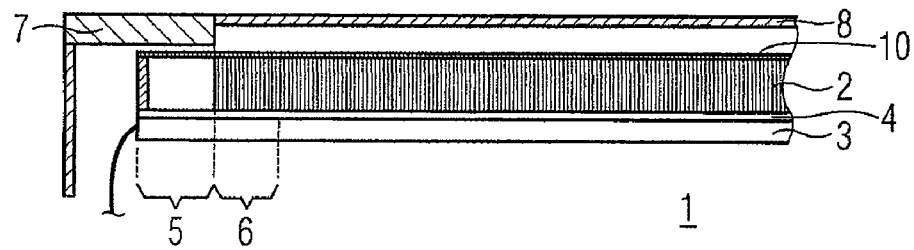
FIG. 2 shows a side view of the X-ray detector according to FIG. 1.

FIG. 1 shows as a section from a conventional X-ray detector 1 a top view of a scintillator 2 with dark reference zone 5 arranged on the side. FIG. 2 also shows a section from the X-ray detector 1 according to FIG. 1 in a side view, showing a part of the housing 8 and a lead shielding 7 in addition to the scintillator 2 and the active matrix 3 arranged underneath. The lead shielding 7 is used for shielding X radiation and, as a result, generates the DRZ 5.

The scintillator 2 which is stabilized, for example, by a thin glass substrate 10 on its top ends before the beginning of the DRZ 5 and does not extend into the latter. The scintillator 2 and the active matrix 3 are connected to one another by an adhesive layer 4. In the edge area 6 of the cross-over area between the scintillator 2 and the active matrix 3, quality losses are caused in an X-ray image read out of the active matrix 3 due to the temperature fluctuations already described and the resultant artifacts. The DRZ 5 and the edge area 6 of the cross-over area between the scintillator 2 and the active matrix 3 result in a considerable reduction in the usable area of the X-ray detector.

Figure 3:
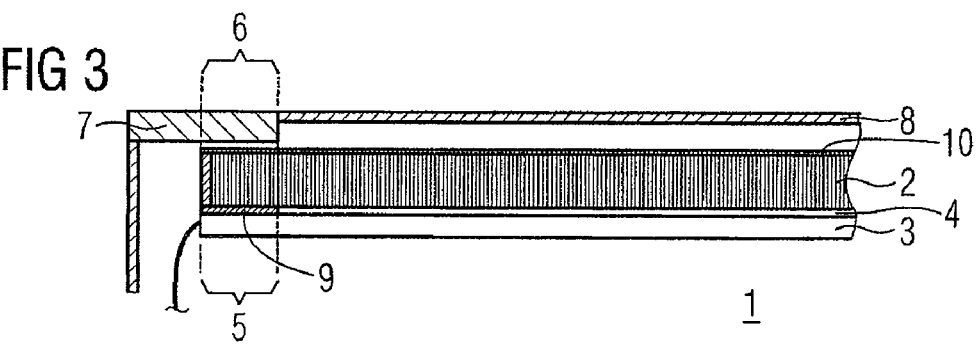
FIG. 3 shows a side view of an X-ray detector according to an embodiment with a light-absorbing adhesive layer.

FIG. 3 shows in a side view an X-ray detector 1 according to an embodiment, in which the active matrix 3 is shielded in an optically opaque manner by a light-absorbing layer 9 with respect to the scintillator 2 in the edge area 6 of the cross-over area of the scintillator 2 and the active matrix 3. Due to the light-absorbing layer 9 and due to the fact that the scintillator 2 extends to the edge of the active matrix 3, a DRZ 5 is formed which can be used for line noise corrections. There is a cross-over of the DRZ 5 and the low-quality edge area 6 of the cross-over area of the scintillator 2 and the active matrix 3 which leads to a larger usable area than in comparable conventional X-ray detectors. To obtain the same unrestrictedly usable detector area in known comparable X-ray detectors, the DRZ 5, and thus important corrections, would have to be omitted. In addition, the DRZ 5 is protected against the incident X radiation by X-ray shielding 7 in the X-ray detector 1 shown in FIG. 3.

The light-absorbing layer 9 or coating can also be provided in the form of a light-absorbing adhesive. The layer or coating is advantageously black for particularly effective shielding or has a spectral sensitivity which greatly deviates from the scintillator 2. For example, an enamel coating which was applied photolithographically can be present. Optically opaque nanoparticles of nonreflective material can also be arranged in the edge area 6 of the cross-over area of the scintillator 2 and the active matrix 3 on the active matrix 3.

Figure 4:
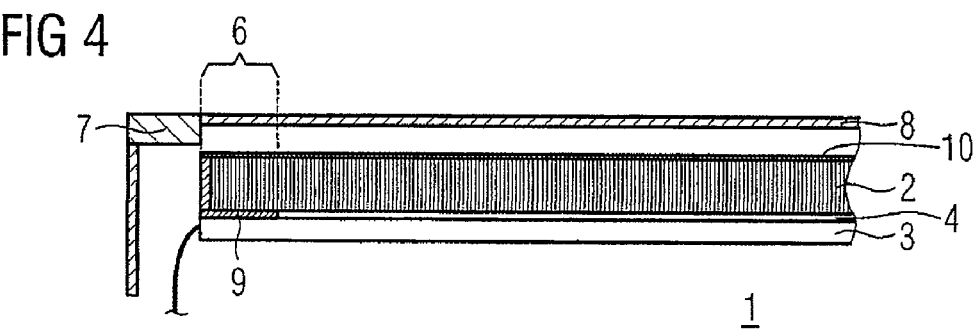
FIG. 4 shows a side view of a further X-ray detector according to an embodiment with a light-absorbing adhesive layer.

FIG. 4 shows an X-ray detector 3 in which the lead shielding 7 is shaped in such a manner that it does not shield the edge area 6 of the scintillator 2 against X radiation. In the edge area 6 of the cross-over area of the scintillator 2 and the active matrix 3, the optically opaque layer 9 is arranged between the scintillator 2 and the active matrix 3.

FIG. 5 shows illustratively a top view of a scintillator 2 in which in each case an edge area 6 of the cross-over area between the scintillator 2 and the active matrix 3 is formed with an optically opaque layer 9 between the scintillator 2 and the active matrix 3 as dark reference zone 5 on a first side 11 and an opposite second side 12.

In the case of dynamic applications, an LNC is indispensable so that the invention can be applied preferably for X-ray detectors which are provided for such dynamic applications such as, for example, 3-D imaging by means of a movable C arc and digital subtraction angiography (DSA).

In summary: To reduce quality losses in edge areas of an X-ray image, caused by temperature fluctuations, an X-ray detector is arranged with a scintillator for converting X radiation into light and with an active matrix of pixel readout elements, arranged behind it in the direction of the X radiation, in such a manner that the active matrix is shielded in an optically opaque manner with respect to the scintillator in at least one edge area of the cross-over area of scintillator and active matrix; in particular, the optically opaque shielding is suitable for forming a dark reference zone when the scintillator is present.

What is claimed is:

1. A digital X-ray detector comprising:
   a scintillator for converting X radiation into light, and
   an active matrix of pixel readout elements arranged behind the scintillator in the direction of X radiation, the active matrix of pixel readout elements configured to convert light from the scintillator into electrical charges from which an X-ray image is generated, wherein the active matrix is shielded in an optically opaque manner by a light-absorbing shielding layer located at a junction between the scintillator and the active matrix in at least one edge area of a cross-over area of said scintillator and the active matrix.

2. The X-ray detector according to claim 1, wherein the area of the scintillator, the area of the active matrix and the cross-over area of the scintillator and the active matrix are essentially congruent.

3. The X-ray detector according to claim 1, wherein shielding of the scintillator with respect to incident X radiation is provided in the edge area of the cross-over area of the scintillator and the active matrix.

4. The X-ray detector according to claim 1, wherein the light-absorbing shielding layer located between the scintillator and active matrix includes a black layer or coating.

5. The X-ray detector according to claim 1, wherein the light-absorbing shielding layer is formed by a light-absorbing adhesive.

6. The X-ray detector according to claim 1, wherein the edge area of the cross-over area between the scintillator and the active matrix has a width of between 10- and 100-times the width of a pixel readout unit.

7. The X-ray detector according to claim 1, wherein the light-absorbing shielding layer covers at least two opposite edge areas.

8. A digital X-ray detector comprising:
   a scintillator for converting X radiation into light,
   an active matrix of pixel readout elements arranged behind the scintillator and operable to convert light from the scintillator into electrical charges from which an X-ray image is generated, and
   a light-absorbing optical shield frame arranged at a junction between the scintillator and the active matrix shielding light in at least one edge area of a cross-over area of the scintillator and the active matrix.

9. The X-ray detector according to claim 8, wherein the area of the scintillator, the area of the active matrix and the cross-over area of the scintillator and the active matrix are essentially congruent.

10. The X-ray detector according to claim 8, wherein the light-absorbing optical shield frame extends in the edge area of the cross-over area of the scintillator and the active matrix.

11. The X-ray detector according to claim 8, wherein the light-absorbing optical shield frame is a light-absorbing layer or coating.

12. The X-ray detector according to claim 11, wherein the light-absorbing optical shield frame is black.

13. The X-ray detector according to claim 11, wherein the light-absorbing layer is formed by a light-absorbing adhesive.

14. The X-ray detector according to claim 8, wherein the edge area of the cross-over area between the scintillator and the active matrix has a width of between 10- and 100-times the width of a pixel readout unit.

15. The X-ray detector according to claim 8, wherein the active matrix is shielded in an optically opaque manner with respect to the scintillator in two opposite edge areas.

* * * * *